United States Patent Office 3,146,227
Patented Aug. 25, 1964

---

3,146,227
SYNTHESIS OF MUSTARD OIL GLUCOSIDES
Martin G. Ettlinger, Houston, Tex., and George P. Dateo, Jr., Framingham, Mass., assignors to the United States of America as represented by the Secretary of the Army
No Drawing. Filed Sept. 27, 1962, Ser. No. 227,646
14 Claims. (Cl. 260—210)

This invention relates to a novel process for synthesizing mustard oil glucosides, to novel hydroxamyl chloride-O-sulfonates useful in the synthesis of mustard oil glucosides, and to a novel process for the preparation of hydroxamyl chlorides, an intermediate in the formation of hydroxamyl chloride-O-sulfonates.

Mustard oil glucosides are naturally occurring compounds found in certain families of higher plants, among which the Cruciferae, which includes the mustards, cabbages, radishes and cresses, is prominent. The mustard oil glucosides are precursors of mustard oils, the latter resulting from the enzymatic hydrolysis of the former. Mustard oil glucosides can be represented by the following formula:

(1)
$$R-\overset{SY}{C}=NOSO_3M$$

where R is an aliphatic, araliphatic, aryl or heterocyclic radical and preferably is an alkyl, alkylthioalkyl, alkylsulfinylalkyl, alkylsulfonylalkyl, hydroxyl substituted alkyl, ester substituted alkyl, alkylene, alkylthioalkylene, alkylsulfinylalkylene, alkylsulfonylalkylene, hydroxyl subsituted alkylene, aryl, hydroxy substituted aryl, alkoxy substituted aryl, ester substituted aryl, aralkyl, hydroxy substituted aralkyl, and 3-indolyl. Specific examples of R include the following: methyl, ethyl, isopropyl, 2-butyl, butyryloxymethyl, allyl, 3-butenyl, 4-pentenyl, 3-methylthiopropyl, 3-methylsulfinylpropyl, 3-methylsulfonylpropyl, 4-methylthiobutyl, 4-methylsulfinylbutyl, 4-methylsulfinyl-3-butenyl, 4-methylsulfonylbutyl, 5-methylthiopentyl, 5-methylsulfinylpentyl, 8-methylsulfinyloctyl, 9-methylsulfinylnonyl, 10-methylsulfinyldecyl, phenyl, benzyl, p-hydroxybenzyl, p-methoxybenzyl, 2-phenylethyl, 3-benzoyloxypropyl, 2-hydroxyisobutyl, 2-hydroxy-3-butenyl, 2-hydroxy-2-phenylethyl, 2-hydroxy-isopropyl, 3-indolyl. Y is β-D-1-glucopyranosyl and M is a cation such as alkali metal, alkaline earth, ammonium and substituted ammonium.

Mustard oils are flavoring principles that produce a sharp and burning sensation when applied to the tongue and in some cases, e.g., allyl isothiocyanate, give off a pungent odor. They have been used extensively as condiments and are known to possess antibacterial and antifungal properties. The flavor of many food items depends on the development of mustard oils from the breakdown of the parent glucosides. The enzymatic cleavage of the glucoside to the isothiocyanate (mustard oil) may be represented as follows:

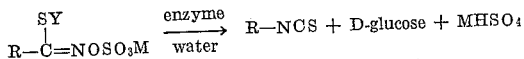
$$R-\overset{SY}{C}=NOSO_3M \xrightarrow[\text{water}]{\text{enzyme}} R-NCS + D\text{-glucose} + MHSO_4$$

The enzymes and glucoside substrate are kept separate in plant tissue and hydrolytic fission does not occur until the cells of the plant tissue are ruptured bringing the enzyme and the glucoside together.

Conventional food processing techniques designed to preserve or stabilize perishable foods are known to impair or destroy the natural flavor of fresh food. A relatively recent food processing technique, irradiation, is usually accompanied by the development of off-flavors in the irradiated product. The addition of small quantities of mustard oil glucosides to processed foods prior to serving would restore or enhance their natural flavor or would tend to mask any off-flavors present. In the event that the natural enzyme activity of the item is destroyed as by thermal processing the enzyme may be added with the glucoside in dry form since the enzymatic cleavage requires the presence of moisture.

In view of the obvious difficulty in obtaining large quantities of pure or specific mustard oil glucosides from plant sources there exists a need for a simple, inexpensive method of synthesizing such compounds which this invention proposes to solve.

We have also discovered a novel class of compounds, the hydroxamyl chloride-O-sulfonates, which are useful as intermediates in our novel synthesis of mustard oil glucosides. We have further discovered in our investigations a novel process of forming a class of compounds, hydroxamyl chlorides, which are valuable as intermediates in the formation of hydroxyamyl chloride-O-sulfonates.

Hydroxamyl chlorides are prepared according to our invention by reacting an aldoxime with a tertiary alkyl hypochlorite, preferably t-butylhypochlorite. The reaction takes place in an organic solvent, e.g., ether, methanol, acetone, and at temperatures preferably below 0° C. Aldoximes suitable in this process may be represented by the formula

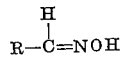
$$R-\overset{H}{C}=NOH$$

R has the same significance as in Formula 1. Hydroxamyl chloride is represented by the formula

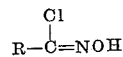
$$R-\overset{Cl}{C}=NOH$$

where R has the same meaning as in the aldoxime formula above. The product may be removed from the solvent by low temperature crystallization. This novel process of forming hydroxamyl chlorides is especially advantageous in that hydrogen chloride is not formed as a by-product which would catalyze the conversion of an isomeric mixture of the product to one isomeric form, it is not necessary to carefully neutralize the reaction product, and, additionally, it is not attended by any unwanted salt formation.

PREPARATION OF BENZOHYDROXAMYL-CHLORIDE

Example I 6.25 g. of t-butyl hypochlorite (88% by assay) prepared according to the procedure described by Teeter and Bell in Organic Syntheses, 32, 20 (1952), was added dropwise to 6.25 g. (1.0 mol. equiv.) of α-benzaldoxime in 50 ml. of absolute methanol at −20° C. After 9 hours the solution was evaporated in vacuum while the temperature was maintained below 0° C. From 8.02 g. of crude syrupy product there was obtained 3.35 g. of benzohydroxamyl chloride, M.P. 46–50° C. by centrifugation at 0° C. The benzohydroxamyl chloride slowly formed a violet coloration with ferric chloride in aqueous methanol, gave a positive Beilstein test and the ultra violet spectrum exhibited λ max. 250 mμ (log ε 405) in ethanol.

α-Benzaldoxime, B.P. 85° at 3 mm., was obtained by reacting benzaldehyde and hydroxylamine hydrochloride in aqueous alcohol with potassium acetate (1+mol. equiv.) at pH 5 and crystallized out of solution.

PREPARATION OF ACETOHYDROXAMYL CHLORIDE

Example II 0.863 g. of acetaldoxime., B.P. 113–115° C., prepared according to Wieland, Ber., 40, 1676 (1907), was dissolved in 20 ml. of anhydrous ether and at a bath temperature of −60° C. There was added 1.85 g. of t-butyl hypochlorite (83% by assay). 35 ml. of N,N-dimethylformamide was slowly added to the blue solution of chloronitrosoethane. 20 ml. of methanol was added and the solution was permitted to warm to room temperature. After approximately 30 minutes the solution became colorless which indicated the tautomeric conversion to acetohydroxamyl chloride. The product was not isolated from solution but was identified by its conversion to acetohydroxamyl chloride-O-sulfonate in Example V.

The sulfonation of hydroxamyl chlorides results in the formation of a new class of compounds, the hydroxamyl chloride-O-sulfonates. These novel compounds are valuable as intermediates in the synthesis of mustard oil glucosides. The reaction for the formation of hydroxamyl chloride-O-sulfonates may be expressed as follows:

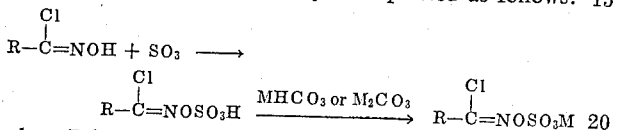

where R has the same significance as in Formula 1. M is a cation such as alkali metal, alkaline earth, ammonium, and substituted ammonium and, preferably, is sodium, potassium, tetramethylammonium, tetra-n-propylammonium and sinapine.

The $SO_3$ is preferably in the form of pyridine-sulfur trioxide complex, or dimethyl-formamide-sulfur trioxide complex since in these forms the reaction with the hydroxamyl chloride is less violent, and in the case of the latter a homogeneous solution of reactants is obtained.

PREPARATION OF POTASSIUM BENZOHYDROXAMYL CHLORIDE-O-SULFONATE

Example III

A mixture of 1.06 g. of crystalline benzohydroxamyl chloride and 1.29 g. (1.2 mol. equiv.) of pyridine-sulfur trioxide complex in 25 ml. of carbon tetrachloride was stirred for 18 hours while at a temperature of about 28° C. The mixture was chilled, the supernatant removed and the insoluble residue washed with ether with exclusion of moisture. 20 ml. of ether and 4 ml. of 3 N potassium carbonate were added to the solid at 15° C. The ether phase was removed and after two extractions with ether the product was collected from the aqueous phase at 0° C. and washed with ice water, methanol and ether. The material (1.55 g.) was extracted with three 50 ml. portions of hot (approx. 50° C.) methanol leaving an insoluble residue of 0.26 g. Crystallization by evaporation of the filtrate afforded 1.08 g. of potassium benzohydroxamyl chloride-O-sulfonate, M.P. 190° dec., in water λmax. 250 mμ (log ε 4.14).

Analysis.—Calcd. for $C_7H_5O_4NSClK$: C, 30.71; H, 1.84; N, 5.12; S, 11.71; Cl, 12.95. Found: C, 30.59; H, 2.20; N, 5.02; S, 11.89; Cl, 13.12.

Pyridine-sulfur trioxide complex, M.P. 144–155°, was obtained by the reaction of pyridine and chlorosulfonic acid, B.P. 151°, in chloroform at 10° C. according to the procedure of Sisler and Audrieth, Inorganic Synthesis 2, 173 (1946).

PREPARATION OF POTASSIUM ACETOHYDROXAMYL CHLORIDE-O-SULFONATE

Example IV

To a solution of acetaldoxime (0.672 g.) in 50 ml. of ether at a temperature of −50° C. was added 1.30 ml. (0.99 mol. equiv.) of t-butyl hypochlorite (87% by assay). After 10 hours the solution was evaporated at 0° C. and to the acetohydroxamyl chloride residue there was added 15 ml. of carbon tetrachloride and 1.86 g. of pyridine-sulfur trioxide. After 20 hours the carbon tetrachloride was decanted and the residue was washed with anhydrous ether. 20 ml. of ether and 5 ml. of 3 N $K_2CO_3$ were added to the residue at a temperature of 5° C. and the solution adjusted to pH 7 by the addition of base.

The ether layer was removed and the aqueous phase washed with ether, chilled and filtered yielding 0.561 g. of precipitate. The filtrate was evaporated leaving a gelatinous residue which was extracted with aqueous methanol and the extract crystallized by evaporation yielding 0.340 g. of material. The crystallized material and the precipitate were combined and extracted with five 10 ml. portions of warm methanol and crystallization by evaporation yielded 0.240 g. of potassium acetohydroxamyl chloride-O-sulfonate. This substance was dissolved in 3 ml. of methanol at 50° C. leaving a trace of insoluble sulfate. The supernatant was separated and concentrated to about 1.5 ml. The resulting precipitate was put into solution by the addition of water at 50° C. Crystallization at 0° C. afforded 0.151 g. of analytically pure potassium acetohydroxamyl chloride-O-sulfonate hemihydrate, M.P. 115–120° C. dec. An aqueous solution of the substance had no ultra violet maximum, absorbing at 200 mμ with log ε 2.6 and at 210 mμ with log ε 3.2.

Analysis.—Calcd. for $C_2H_3O_4NSClK \cdot \frac{1}{2}H_2O$: C, 10.89; H, 1.83; N, 6.35; S, 14.53; Cl, 16.06; $H_2O$, 4.08. Found: C, 11.13; H, 2.21; N, 6.32; S, 14.66; Cl, 15.96; $H_2O$, 4.1.

Example V

An improved yield of acetohydroxamyl chloride-O-sulfonate was obtained by sulfonation in homogeneous solution and neutralization with solid potassium bicarbonate. 1.85 g. of t-butyl hypochlorite (83.5%) was added to 0.863 g. of acetaldoxime in 20 ml. of anhydrous ether at −60° C. 35 ml. of N,N-dimethylformamide was slowly added and the solution permitted to warm. After 30 minutes the solution was rechilled and 20 ml. of 1.45 M, N,N-dimethylformamide-sulfur trioxide prepared by distillation of stabilized liquid sulfur trioxide into freshly distilled dimethylformamide stirred at −10° C. with exclusion of moisture was added. After 22 hours at room temperature 4.36 g. of powdered potassium bicarbonate was added and stirred until evolution of carbon dioxide was undetectable and no acid reaction occurred with wet pH paper. The supernatant was separated and the residue extracted with three 25 ml. portions of warm methanol. The supernatant and extracts were combined and evaporated leaving a cloudy yellow syrup which crystallized on trituration with methanol. The material was extracted with several portions of warm methanol and the product (1.87 g.) was crystallized by evaporation. A 0.262 g. sample of the product was again extracted with methanol at room temperature and evaporation of the extract yielded 0.219 g. of pure potassium acetohydroxamyl chloride-O-sulfonate hemihydrate.

The novel hydroxamyl chloride-O-sulfonates may be condensed with a glucopyranosyl mercaptide to form a mustard oil glucoside. The reaction may be expressed as follows:

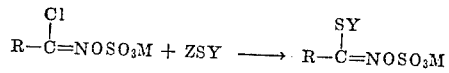

where R has the same significance as in Formula 1. M is selected from the group comprising alkali metal, alkaline earth metal, ammonium, and substituted ammonium, and, preferably, is sodium, potassium, tetramethylammonium, tetra-n-propylammonium and sinapine. Z is a water soluble cation, e.g., sodium and potassium and Y is β-D-1-glucopyranosyl. The reaction takes place in water and the product is obtained by evaporation. The synthetically produced glucosides are enzymatically cleaved in the same manner as the naturally occurring glucosides producing the corresponding mustard oil.

PREPARATION OF GLUCOCAPPARIN

Example VI 0.157 g. of potassium acetohydroxamyl chloride-O-sulfonate and 0.180 g. (1 mol. equiv.) of sodium β-D-1-glucopyranosyl mercaptide (dihydrate) were dissolved in 1 ml. of deoxygenated water and allowed to stand under nitrogen at room temperature. After 24 hours the solution was diluted dropwise with methanol to a volume of 4 ml. Crystallization occurred overnight at room temperature. After a few hours at 0° C., 0.185 g. of product was obtained which exhibited an infrared spectrum (Nujol mull) identical with that of glucocapparin. The product in 2 ml. of water was passed through 4 g. of cation resin in potassium form (8 mm. x 14 cm.) followed by 15 ml. of water. The effluent was evaporated and the residue crystallized from methanol to afford 0.159 of glucocapparin, M.P. 205–210° C. dec., identified by infrared spectrum (potassium bromide disc).

Glucocapparin in a phosphate buffer (pH 6.7) is hydrolyzed by yellow mustard enzyme contained in yellow mustard flour (*Sinapis alba*) to the mustard oil methyl isothiocyanate.

Sodium β-D-1-glucopyranosyl mercaptide was prepared by combining 25.5 g. of acetobromoglucose and 7.06 g. of powdered thiourea in 75 ml. of dry acetone. The mixture was shaken for 15 minutes and allowed to stand at room temperature overnight. After chilling to 0° the precipitated solid (2,3,4,6-tetracetyl-β-D-1-glucopyranosylisothiuronium bromide) was collected, washed with acetone and dried in vacuum over calcium chloride. A suspension of 2.97 g. of the dried solid in 5 ml. of methanol at −15° C. was treated with 10.3 ml. of 1.78 M sodium methoxide chilled to −15° C. The resulting solution was allowed to stand in an ice bath for a few minutes, warmed to room temperature and filtered with a rinse of 1 ml. of methanol. The filtrate was neutralized with 4.4 ml. of 1 N aqueous acetic acid and crystals formed. The sodium β-D-1-glucopyranosyl mercaptide dihydrate crystals were collected and washed with methanol at 0° C.

*Example VII*

0.130 g. of potassium benzohydroxamyl chloride-O-sulfonate and 0.118 g. (0.96 mol. equiv.) of sodium β-D-1-glucopyranosyl mercaptide (dihydrate) were dissolved in 2 ml. of deoxygenated water. The solution was allowed to stand under nitrogen for 21 hours at room temperature. The residue from evaporation was freed from inorganic salt by methanol extraction, followed by concentration of extract to dryness. The product in 1 ml. of water was treated with cation exchange resin (8 mm. x 15 cm. column) in tetra-n-propylammonium form. The eluate furnished 0–211 g. of tetra-n-propylammonium phenylglucosinolate, M.P. 180° dec., identified by infrared spectrum (Nujol mull).

36.7 mg. of tetra-n-propylammonium phenylglucosinate was treated in 10 ml. of 0.1.M phosphate buffer, pH 6.7, with 1.00 mg. of yellow mustard flour (from the yellow mustard seed *Sinapis alba*) and 4.90 mg. of L-ascorbic acid. The mixture was shaken mechanically with 25 ml. of peroxide free ether at 36–37° C. After 30 minutes the mustard oil, phenyl isothiocyanate, had collected in the ether phase which was identified by ultraviolet spectrum in ethanol dilution (25 ml.) of a 1 ml. aliquot.

We claim:
1. Potassium acetohydroxamyl chloride-O-sulfonate.
2. Potassium benzohydroxamyl chloride-O-sulfonate.
3. A process for synthesizing mustard oil glucosides having the formula:

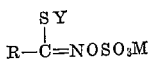

where R is a member of the group consisting of alkyl, alkylthioalkyl, alkylsulfinylalkyl, alkylsufonylalkyl, hydroxy substituted alkyl, lower-alkylene, alkylthio-loweralkylene, alkylsulfinyl - lower - alkylene, alkylsulfonyl-lower - alkylene, hydroxy - substituted lower - alkylene, phenyl, hydroxy substituted phenyl, alkoxy substituted phenyl, aralkyl, hydroxy substituted aralkyl, and indolyl, Y is β-D-1 glucopyranosyl and M is selected from the group consisting of alkali metal, alkaline earth metal, ammonium, lower-alkyl ammonium, and sinapine; which comprises reacting a hydroxamyl chloride-O-sulfonate having the formula:

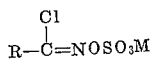

where R and M are defined above, with a water soluble β-D-1-glucopyranosyl mercaptide.
4. A process according to claim 3 wherein R is methyl.
5. A process according to claim 3 wherein R is phenyl.
6. A compound having the formula:

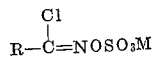

where R is a member of the class consisting of alkyl, alkylthioalkyl, alkylsulfinylalkyl, alkylsulfonylalkyl, hydroxy substituted alkyl, lower-alkylene, alkylthio-loweralkylene, alkylsulfinyl-lower-alkylene, alkylsulfonyl-loweralkylene, hydroxy substituted lower-alkylene, phenyl, hydroxy substituted phenyl, alkoxy substituted phenyl, aralkyl, hydroxy substituted aralkyl, and indolyl and M is selected from the group consisting of alkali metal, alkaline earth metal, ammonium, lower-alkyl substituted ammonium, and sinapine.
7. A compound according to claim 6 wherein R is methyl.
8. A compound according to claim 6 where R is phenyl.
9. A method of preparing hydroxamyl chlorides having the formula:

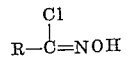

where R is a member of the class consisting of alkyl, alkylthioalkyl, alkylsulfinylalkyl, alkylsulfonylalkyl, hydroxy substituted alkyl, lower-alkylene, alkylthio-loweralkylene, alkylsulfinyl-lower-alkylene, alkylsulfonyl-loweralkylene, hydroxy substituted lower-alkylene, phenyl, hydroxy substituted phenyl, alkoxy substituted phenyl, aralkyl, hydroxy substituted aralkyl, and indolyl, which comprises reacting an aldoxime having the formula:

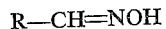

where R is defined as above with tertiary butyl hypochlorite.
10. A method according to claim 9 wherein R is methyl.
11. A method according to claim 9 wherein R is phenyl.
12. A process of synthesizing a hydroxamyl chloride-O-sulfonate having the formula:

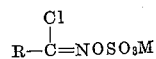

where R is a member of the class consisting of alkyl, alkylthioalkyl, alkylsulfinylalkyl, alkylsulfonylalkyl, hydroxy substituted alkyl, lower-alkylene, alkylthio-loweralkylene, alkylsulfinyl-lower-alkylene, alkylsulfonyl-loweralkylene, hydroxy substituted lower-alkylene, phenyl, hydroxy substituted phenyl, alkoxy substituted phenyl, aralkyl, hydroxy substituted aralkyl and indolyl, and M is selected from the group consisting of alkali metal, alkaline earth metal, ammonium, lower-alkyl substituted ammonium and sinapine, which comprises reacting an hydroxamyl chloride having the formula:

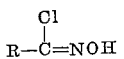

where R is defined as above, with sulfur trioxide, and reacting the sulfonated reaction product with a member of the group consisting of:

$$MHCO_3 \text{ and } M_2CO_3$$

where M is defined as above.
13. A process according to claim 12 where R is methyl.
14. A process according to claim 12 wherein R is phenyl.

No References Cited.